United States Patent [19]
Tuttle et al.

[11] Patent Number: 5,775,198
[45] Date of Patent: Jul. 7, 1998

[54] CONTROL SYSTEM FOR A LIMITED STALL LOAD ACTIVATOR

[75] Inventors: David J. Tuttle; Edward J. Zielinski, both of South Bend, Ind.

[73] Assignee: AlliedSignal Inc., Morristown, N.J.

[21] Appl. No.: 813,474

[22] Filed: Mar. 7, 1997

[51] Int. Cl.⁶ ................................. F15B 11/10
[52] U.S. Cl. .................. 91/433; 91/446; 91/448; 91/469
[58] Field of Search ............... 91/433, 446, 448, 91/469

[56] References Cited

U.S. PATENT DOCUMENTS

| | | | |
|---|---|---|---|
| 3,874,269 | 4/1975 | Walters | 91/433 |
| 4,210,165 | 7/1980 | Kitsugi | 91/433 |
| 4,555,977 | 12/1985 | Motzer | 91/446 |
| 5,351,601 | 10/1994 | Zeuner | 91/445 |

*Primary Examiner*—Thomas E. Denion
*Assistant Examiner*—Bijan N. Karimi
*Attorney, Agent, or Firm*—Larry J. Palguta; John R. Rafter

[57] ABSTRACT

A control system (10) for a limited stall load actuator (60) comprises a servo pressure regulator (20), solenoid valve (40), relief valve (30) and a shuttle valve (50) connected with a piston actuator 60 such that when source pressure P1 is declining the servo pressure regulator (20) will open to permit more flow and maintain a minimum actuation force effected by the actuator (60), and should there occur a failure of the servo pressure regulator (20) that would permit high source pressure to be communicated to the control system (10), the relief valve (30) will operate to limit the amount of high pressure communicated to the control system (10) such that the actuator (60) will attain no greater than a predetermined maximum output force.

6 Claims, 3 Drawing Sheets

CONTROL SYSTEM FOR A LIMITED STALL LOAD ACTIVATOR

The present invention relates generally to an actuator and a control system therefor, and in particular to a control system that operates to maintain actuator operation at no less than a minimum force output and no greater than a maximum force output, despite variations in fluid pressure communicated to the system.

Fluid pressure operated actuators are utilized in numerous applications, including the actuation of parts of aircraft engines. Current actuation designs may have the inherent deficiency of potentially large stall loads. A stall load is defined as the maximum force the actuator could effect if parts or structures it is actuating jam up and cannot move, thereby causing a pressure buildup and a resulting force output that can exceed desired limits and cause the actuator to damage the part or items that it is actuating. As a result, the actuator, mounting hardware, and any hardware which the actuator is operating must be sized accordingly in order to withstand the stall load. Obviously, this can lead to significant increases in the weights of all of the hardware being actuated by the actuator in order to guarantee the structural integrity of the hardware. The variation in an actuator stall load occurs because the piston has a fixed area and is subjected to a varying pressure differential between the supply pressure and the return pressure, or what is commonly referred to as $\Delta P$. Typically, the actuator piston is sized for a given load output requirement with the minimum available supply pressure. The actuator stall load is the resulting maximum force output of the actuator based on the piston size and maximum $\Delta P$ that the actuator could receive. For applications where the normal operation pressure should be maintained at no less than a minimum level in order to effect a minimum normal operational force output of the actuator, and where the actuator must also be limited to a maximum stall load, the resulting design of the actuator piston according to these parameters could mean that the piston sized for the minimum normal operating force output and also designed to withstand the maximum $\Delta P$ for a normal stall load would require an exceedingly large piston and associated parts. Therefore, it is highly desirable to provide an actuator and a control system which will permit the use of an existing actuator to provide the desired minimum and maximum output forces by means of the control system rather than through implementing an enlargement of the actuator and associated parts.

The present invention provides solutions to the above by providing an actuator and a control system therefor, comprising means for regulating a pressure P1 from a source of pressure, the pressure regulating means receiving a return pressure PF1 and communicating regulated pressure PR1 to means for relieving pressure and to means for limiting regulated pressure PR1, the pressure relieving means communicating the regulated pressure PR1 to means for alternating selectively the regulated pressure between two flow connections, the regulated pressure flow limiting means permitting the regulated pressure PR1 to communicate as an output regulated pressure PR2 with the means for alternating selectively the regulated pressure PR1, return pressure PF1 communicated with the means for alternating selectively the regulated pressure, means for relieving pressure, and means for limiting regulated pressure, the means for alternating selectively the regulated pressure PR1 operable to effect one of providing the regulated pressure PR1 to an actuator to effect actuation thereof and providing the return pressure PF1 to the actuator to effect deactivation thereof, whereby actuation of the means for limiting regulated pressure PR1 affects the output regulated pressure PR2 transmitted to the means for alternating selectively the regulated pressure PR1 such that the actuator receives the return pressure PF1 and moves to a deactivation position.

One way of carrying out the invention is described in detail below with reference to the drawings which illustrate an embodiment in which.

The present invention provides an actuator and control system having a pressure regulator which reduces and holds constant the pressure differential or $\Delta P$ provided to the piston of the actuator. This is done to ensure that the normal operating load can be generated by the piston of the piston actuator during a piston movement, and also to limit the actuator stall load by limiting the maximum pressure differential that can be applied to the actuator piston. Thus, a maximum operating load can be provided during a piston movement and the stall load limited to no higher than a predetermined force value. Additionally, a relief valve is included within the control system so that in case of a failure of the servo pressure regulator the relief valve will shut off the supply of high pressure provided to the piston actuator. It provides a limitation to the supply or source pressure which can be provided in case of a failed regulator and thereby limit the stall load to less than another predetermined force output of the actuator.

Figure 1:
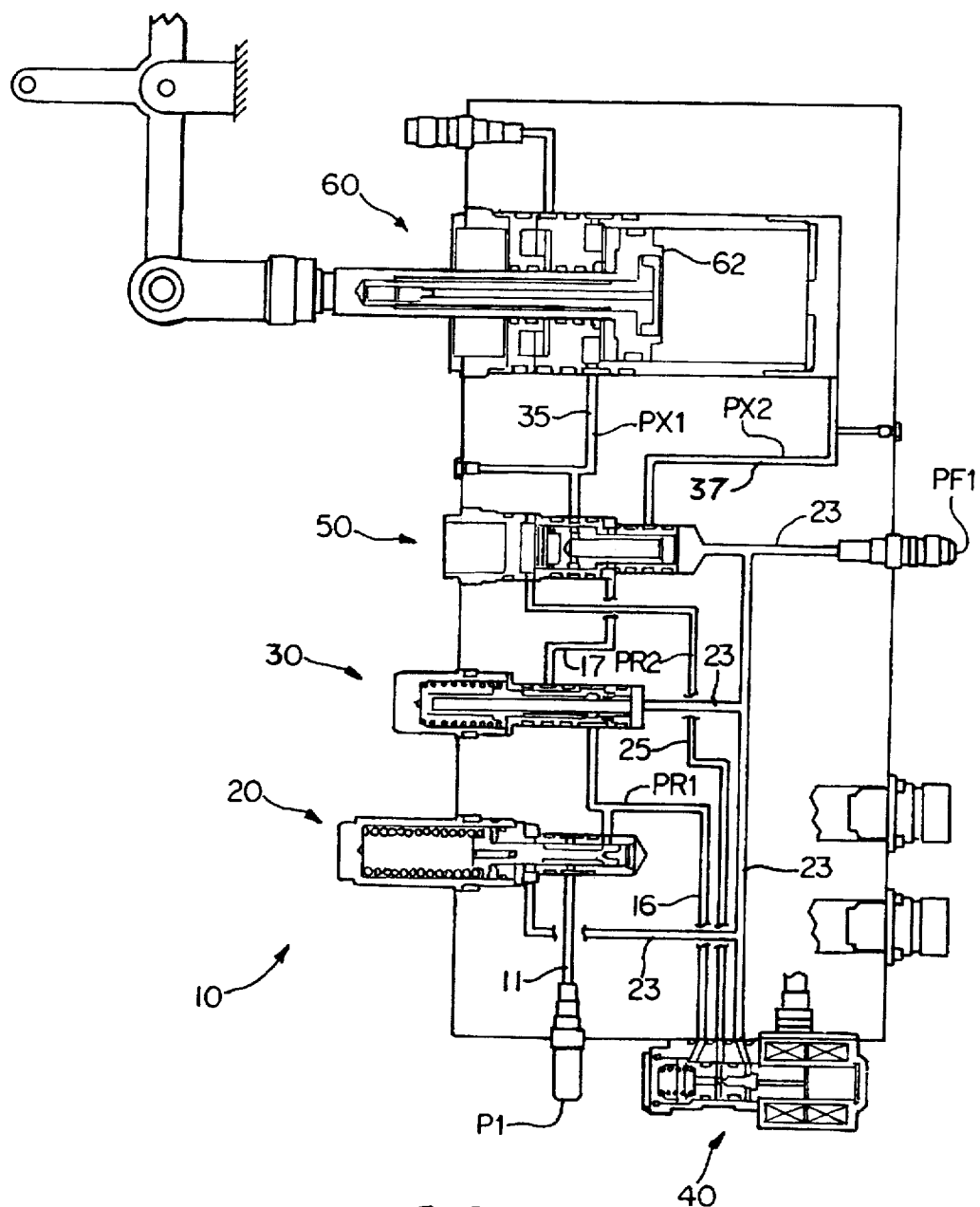
FIG. 1 is a view of the actuator and control system of the present invention.
Figure 2:
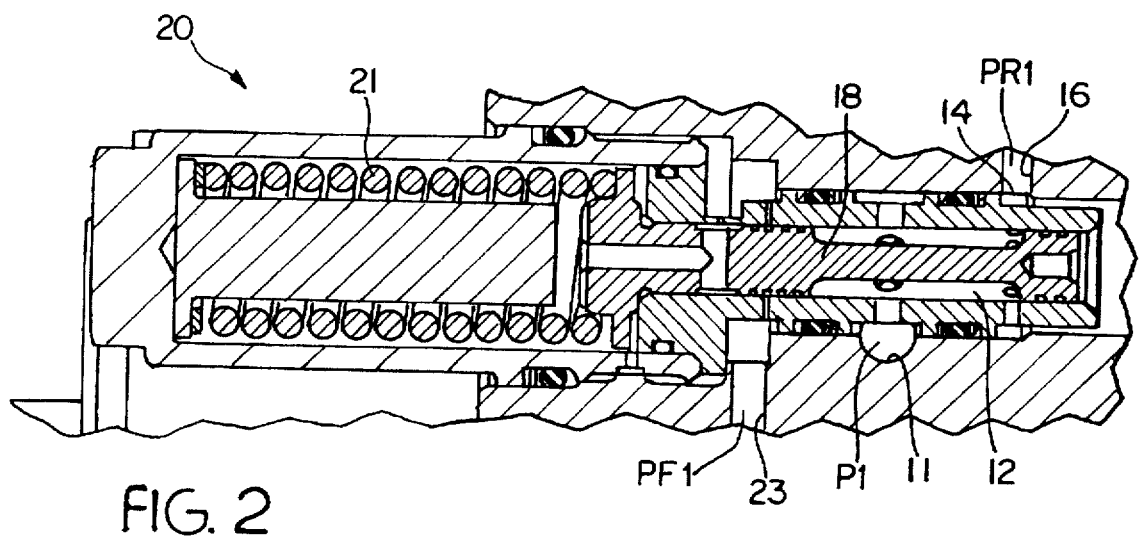
FIG. 2 is an enlarged view of the servo pressure regulator of FIG. 1.

Referring to FIG. 1, supply pressure P1 is supplied to the servo pressure regulator or means for regulating pressure 20 of the actuator and control system designated generally by reference numeral 10. The supply or source pressure P1 is provided through line 11 to the valve cavity 12 (see FIG. 2) where it is further transmitted via port 14 to line 16. As illustrated in FIG. 2, regulator 20 includes a valve member 18 biased by a spring 21, with the left side portion of regulator 20 receiving return pressure via line 23. Servo pressure regulator 20 is designed such that the force of the spring and the return pressure reduces the source pressure P1 to a constant amount above return pressure PF1. The regulated pressure at port 14 is denoted by PR1. The regulator 20 operates so that if an increasing pressure differential occurs between pressures P1 and PF1, slide valve 18 moves toward the left to close off port 14 and limit the pressure transmitted to the actuator such that the stall load of the actuator 60 (see FIG. 1) is maintained below a predetermined value, for example an output force of 3,000 lbs.

Figure 3:
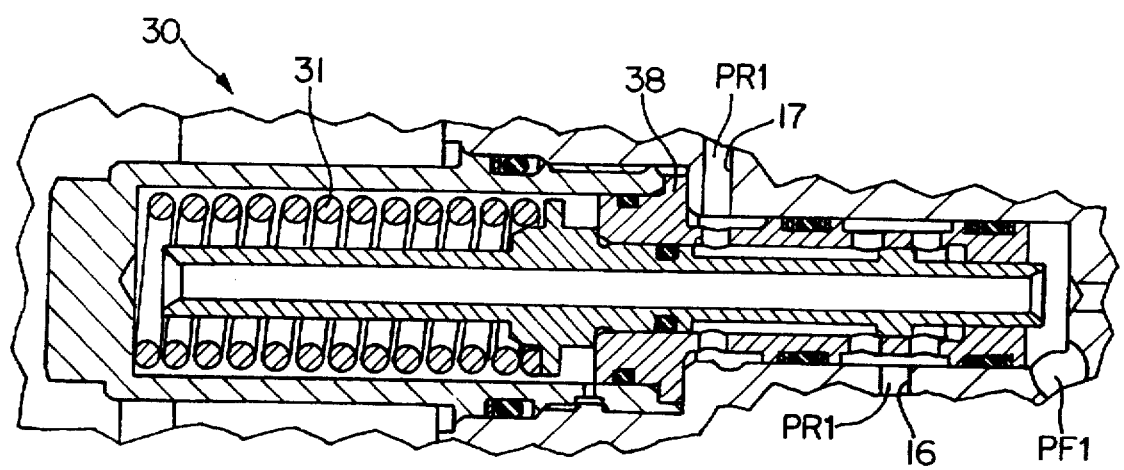
FIG. 3 is an enlarged view of the relief valve of FIG. 1.

The regulated pressure PR1 is communicated via line connection 16 to the relief valve or means for relieving pressure designated generally by numeral 30 in FIGS. 1 and 3. As illustrated in FIG. 3, the relief valve receives return pressure PF1 at its right end, the return pressure being communicated through valve member 38 to the left end wherein is located a spring 31. Regulated pressure PR1 enters relief valve 30 through line 16 and exits via line 17. If servo pressure regulator 20 should fail, an increase in the regulated pressure PR1 flowing through failed regulator 20 would cause valve member 38 to move to the left in FIG. 3 and limit the amount of fluid pressure that can be provided to actuator 60. As a result, relief valve 30 provides a maximum stall load limit for the actuator in the event of a failed servo pressure regulator, for example, 4100 lbs. output force by actuator 60. Once actuation of relief valve 30 occurs, the relief valve causes the piston of the actuator to remain at its current position by effecting a reduction in actuator output force to a level below that of system friction. The relief valve 30 is set at a level of approximately 250 psi higher than the normal operating pressure of servo pressure regulator 20 in order to prevent a dynamic coupling with the regulator, that is, to prevent a dithering motion of the relief valve which could occur at a lower pressure level.

Figure 4:
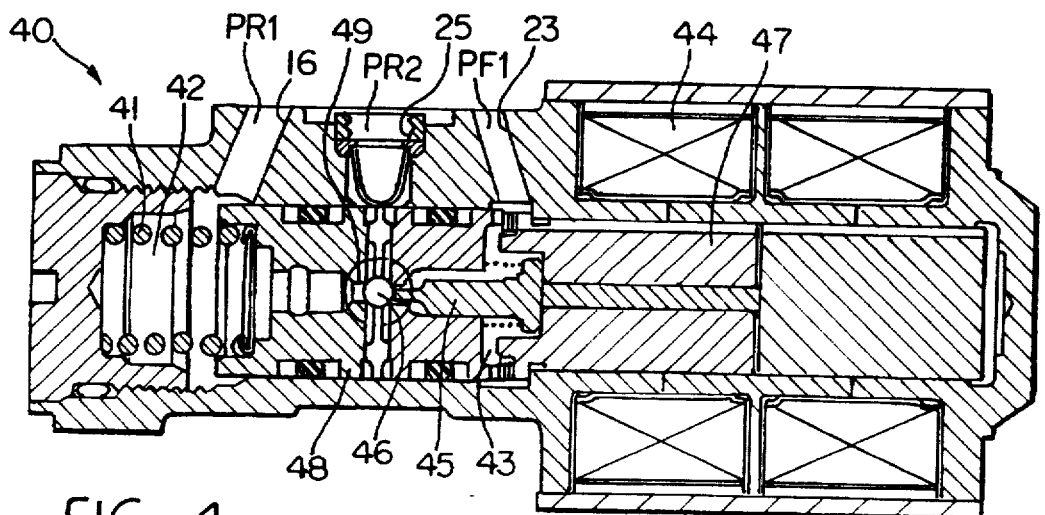
FIG. 4 is an enlarged view of the solenoid valve of FIG. 1.

Regulated pressure PR1 is also transmitted via line 16 to the solenoid valve or means for limiting regulated pressure PR1 designated by reference numeral 40 in FIGS. 1 and 4. Regulated pressure PR1 enters the cavity 42 which houses a spring 41 biasing a valve member 48 (see FIG. 4). Return pressure PFI is communicated via line 23 to a return cavity 43 which houses a valve rod 45. The regulated pressure PR1 flows past a normally open ball valve member 46 to exit as an output regulated pressure PR2 in line 25. Solenoid 40 is in a normally deactivated mode and position so that should there be a failure of the solenoid to operate, regulated pressure will still flow through the solenoid and to line 25. When solenoid 40 is activated by receiving an electrical signal from a full authority digital electronic control ("FADEC"), coils 44 are energized and move a core member 47 to the left in FIG. 4 so that rod 45 moves ball valve member 46 toward valve seat 49 to close off fluid flow therepast. Solenoid valve 40 effects a limiting of the regulated pressure PR1, wherein limiting is defined to include closing off fluid flow and/or lessening fluid pressure depending on the desired effect and application. This will subsequently, as explained below, cause the actuator 60 to move its piston in a retraction direction.

Figure 5:
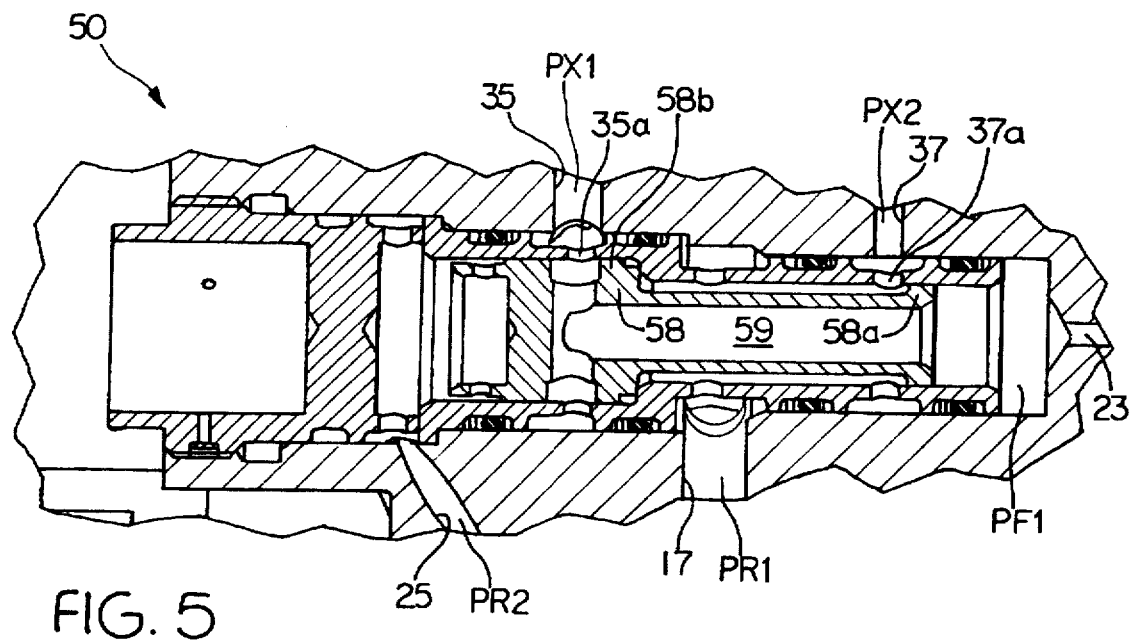
FIG. 5 is an enlarged view of the shuttle valve of FIG. 1.

A shuttle valve or means for alternating selectively the regulated pressure is designated generally by reference numeral 50 in FIGS. 1 and 5. The shuttle valve receives regulated pressure PR2 via line 25 from solenoid valve 40, return pressure PF1 via line 23, and regulated pressure PR1 via line 17 from relief valve 30 and servo pressure regulator 20. The regulated pressure PR1 exits shuttle valve 50 via line 37 as actuation pressure PX2, and return pressure PX1 from the actuator is communicated via line 35 and communicated with return pressure from line 23. Shuttle valve 50 is designed such that the regulated pressure PR1 flows through the valve and out via line 37 as actuation pressure PX2 which effects movement of the piston of actuator 60 so that the piston rod of the actuator extends, while return pressure from the actuator enters as PX1 via line 35 and exits via line 23 to a return. Valve member 58 of valve 50 in FIG. 5 is shown in an extension or activated position wherein regulated pressure PR2 from solenoid valve 40 is at the left end of valve member 58, and return pressure PX1 enters near the left end of valve member 58 via line 35 and becomes return pressure PF1 by flowing through valve member 58 via opening 59 to the return line 23.

When solenoid 40 is activated to reduce, limit or shut off the output regulated pressure PR2, regulated pressure PR1 will cause valve member 58 to move to the left in FIG. 5 such that port 37a is closed off from regulated pressure PR1 from line 17 by the valve member end 58a, and fluid pressure in line 37 is communicated with the return line 23. Likewise, at the other end of valve member 58 valve member end 58b moves to the left of port 35a so that regulated pressure PR1 from line 17 is communicated to line 35, and fluid pressure from line 37 which is within valve member passage 59 is kept from communicating with port 35a by means of valve member end 58b. In the position shown in FIG. 5, regulated pressure PX2 is communicated to the actuator 60 which effects extension movement of the piston and actuator rod. Actuation of solenoid valve 40 causes operatively a reversal of flow so that regulated pressure PR1 is communicated to line 35 to effect a return movement of the piston and retraction of the actuator rod of actuator 60, while return flow enters shuttle valve 50 via line 37 and communicates with return line 23.

Figure 6:
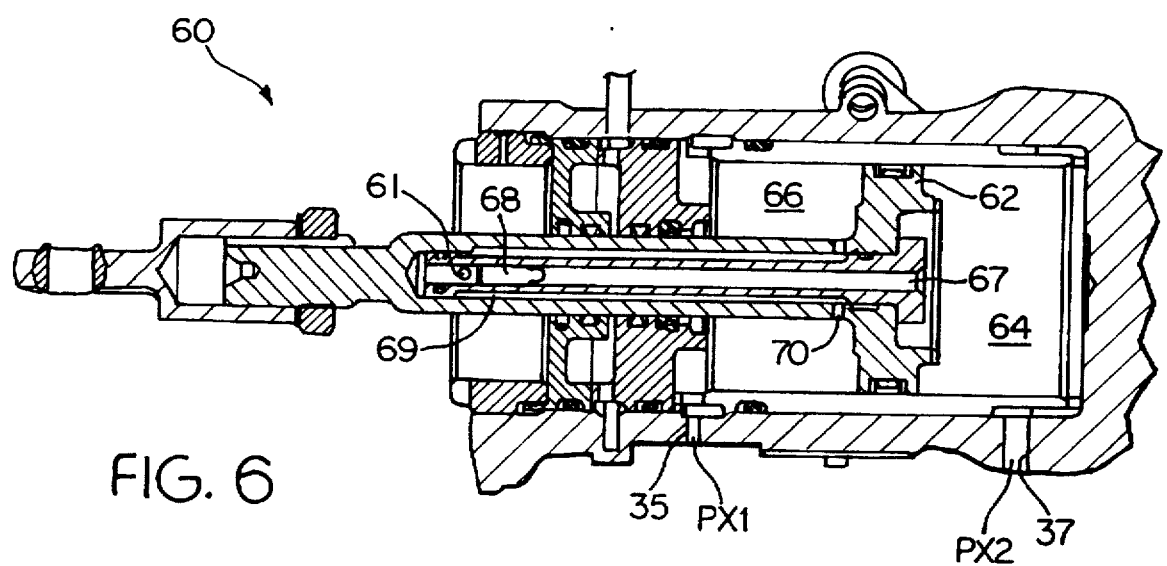
FIG. 6 is an enlarged view of the actuator of FIG. 1.

The actuator is designated generally by reference numeral 60 in FIGS. 1 and 6. Actuator 60 includes a piston 62 and a piston actuator rod 63. Actuation pressure PX2 from shuttle valve 50 via line 37 enters a chamber 64 of actuator 60, and actuation return pressure PX1 exits a chamber 66 on the left side of piston 62 via line 35. When regulated pressure PR1 is entering chamber 64 as actuation pressure PX2, the piston 62 and rod 63 move to the left in an extension direction. When the operation of shuttle valve 50 is reversed by activation of solenoid 40, the regulated pressure PR1 enters actuator chamber 66 via line connection 35 as actuation pressure PX1, and the fluid in chamber 64 exits via line 37 to communicate via shuttle valve 50 with return line 23, and rod 63 retracts. Piston 62 includes an orifice opening 67 which allows fluid flow into the rod bore 68 to assist in the cooling thereof. Because the fluid in bore 68 can flow through opening 61 to outer bore 69 and out of port 70 into chamber 66, this small amount of fluid flow not only cools the rod 63 but at the same time assists in keeping the servo pressure regulator 20 in operation during stall load conditions. This happens because the small amount of flow through rod 63 keeps the regulated pressure PR1 from rising to the level of the input pressure P1. This also allows fluid pressures downstream of relief valve 30 to equalize in the event of a failed pressure regulator 20 and activated relief valve 30 (in other words, the pressure is decreased to a return pressure PF1). Should actuator 60 fail, this would be detected by the FADEC via a switch such as a magnetic switch (not shown) associated with and activated by the piston 62 of the actuator.

The actuator and control system of the present invention provides a novel utilization of an actuator such that both a constant normal output load and an operational stall load can be achieved by the actuator, while a further maximum stall load can be effected by the actuator in case of failure of the servo pressure regulator.

We claim:

1. An actuator and a control system therefor, comprising means for regulating a pressure P1 from a source of pressure, the pressure regulating means receiving a return pressure PF1 and communicating regulated pressure PR1 to means for relieving pressure and to means for limiting regulated pressure PR1, the pressure relieving means communicating the regulated pressure PR1 to means for alternating selectively the regulated pressure between two flow connections, the regulated pressure flow limiting means permitting the regulated pressure PR1 to communicate as an output regulated pressure PR2 with the means for alternating selectively the regulated pressure PR1, return pressure PF1 communicated with the means for alternating selectively the regulated pressure, means for relieving pressure, and means for limiting regulated pressure, the means for alternating selectively the regulated pressure PR1 operable to effect one of providing the regulate pressure PR1 to an actuator to effect actuation thereof and providing a the return pressure PF1 to the actuator to effect deactivation thereof, whereby actuation of the means for limiting regulated pressure PR1 affects the output regulated pressure PR2 transmitted to the means for alternating selectively the regulated pressure PR1 such that the actuator receives the return pressure PF1 and moves to a deactivation position.

2. The actuator and control system in accordance with claim 1, wherein the means for relieving pressure will, upon receiving a regulated pressure PR1 at or above a predetermined threshhold level, operate to limit the regulated pressure PR1 so that limited activation pressure is transmitted operatively to the actuator and an actuation force of the actuator is limited to a maximum predetermined amount.

3. The actuator and control system in accordance with claim 2, wherein the means for alternating selectively the regulated pressure PR1 comprises a shuttle valve, the means for limiting regulated pressure comprises a solenoid valve, and the means for regulating pressure P1 comprises a fluid operated pressure regulator.

4. The actuator and control system in accordance with claim 3, wherein the actuator comprises a piston actuator which receives selectively regulated pressure PR1 from the shuttle valve at opposite sides of a piston of the piston actuator to effect extension and retraction thereof.

5. The actuator and control system in accordance with claim 4, wherein the shuttle valve receives return pressure PF1 at one end thereof and through the shuttle valve and receives one of regulated pressure PR1 and said output regulated pressure PR2 at an opposite end thereof from the solenoid valve, and receives at a mid-portion thereof regulated pressure PR1 for communication selectively to the actuator.

6. The actuator and control system in accordance with claim 5, wherein the shuttle valve comprises within a bore a radially outer shuttle valve member having therein a longitudinal opening in which is disposed slidably an inner slide valve, and the output regulated pressure PR2 communicated to the opposite end of the shuttle valve, such that when the solenoid valve is activated the radially outer shuttle member and inner slide valve are displaced and the regulated pressure PR1 is communicated to an opposite side of the piston of the actuator and the other side of the piston is communicated by the shuttle valve with the return pressure PF1.

* * * * *